(12) United States Patent
Nakatsu

(10) Patent No.: US 8,125,700 B2
(45) Date of Patent: Feb. 28, 2012

(54) OPTICAL SCANNING APPARATUS

(75) Inventor: Haruhiko Nakatsu, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/952,741

(22) Filed: Nov. 23, 2010

(65) Prior Publication Data

US 2011/0116837 A1 May 19, 2011

Related U.S. Application Data

(62) Division of application No. 11/122,085, filed on May 5, 2005, now Pat. No. 7,855,817, which is a division of application No. 10/337,376, filed on Jan. 7, 2003, now Pat. No. 6,947,190.

(30) Foreign Application Priority Data

Jan. 8, 2002 (JP) ................................. 2002-001387

(51) Int. Cl.
*G02B 26/08* (2006.01)

(52) U.S. Cl. .................. 359/204.1; 359/211.2; 359/638; 347/241

(58) Field of Classification Search .................. 359/204, 359/211, 216, 217, 218, 629, 636, 638; 347/233, 347/241, 256, 259
See application file for complete search history.

(56) References Cited

U.S. PATENT DOCUMENTS

| | | | |
|---|---|---|---|
| 4,760,407 A | 7/1988 | Arimoto et al. |
| 4,911,532 A | 3/1990 | Hidaka |
| 5,013,140 A | 5/1991 | Healey et al. |
| 5,210,635 A | 5/1993 | Nagata et al. |
| 5,296,958 A | 3/1994 | Roddy et al. |
| 5,818,496 A | 10/1998 | Hirose et al. |
| 5,834,766 A | 11/1998 | Suhara |
| 5,920,664 A | 7/1999 | Hirabayashi et al. |
| 5,995,268 A | 11/1999 | Shiraishi et al. |
| 6,104,519 A | 8/2000 | Shiraishi et al. |
| 6,181,363 B1 | 1/2001 | Satoh |
| 6,323,889 B1 | 11/2001 | Miura |
| 6,947,190 B2 | 9/2005 | Nakatsu |
| 2003/0085346 A1 | 5/2003 | Yamawaki |

FOREIGN PATENT DOCUMENTS

EP 1109397 A1 6/2001

OTHER PUBLICATIONS

Communication pursuant to Article 96(2) EPC—Appln. No. 03 000 203.4-2304, European Patent Office, Apr. 24, 2006.
Communication—Appln No. 03 000 203.4-2304, European Patent Office, Apr. 17, 2003.
U.S. Appl. No. 12/952,722, filed Nov. 23, 2010.

*Primary Examiner* — Jennifer L. Doak

(74) *Attorney, Agent, or Firm* — Fitzpatrick, Cella, Harper & Scinto

(57) ABSTRACT

An optical scanning apparatus includes a first optical member for receiving a plurality of light beams with an interval and for causing a first group of beams to emerge with a narrower interval, the first optical member being rotatable to adjust the interval of the beams emergent therefrom; a second optical member for receiving a second light beam and the first group of beams emergent from the first optical member with an interval and for causing a third group of beams to emerge with a narrower interval, the second optical member being rotatable to change the interval between the first group of beams and the second beam; and deflecting means for scanningly deflecting a third group of beams emergent from the second optical member.

3 Claims, 10 Drawing Sheets

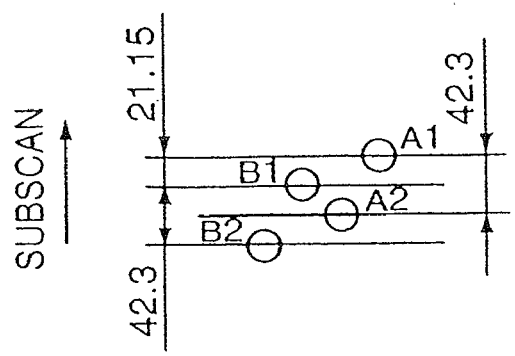
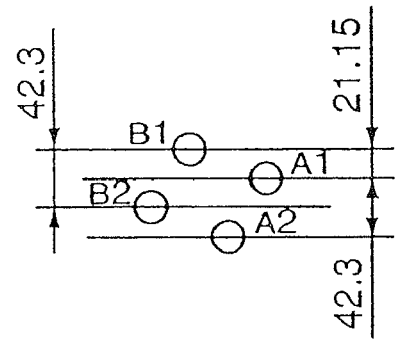
FIG. 4A      FIG. 4B
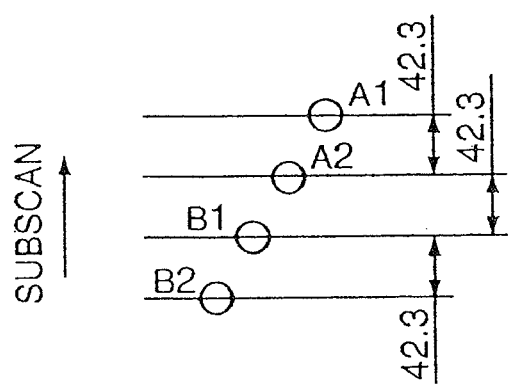
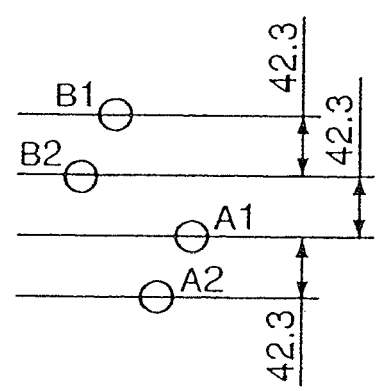
FIG. 5A      FIG. 5B (a)

(b)

OPTICAL SCANNING APPARATUS

This application is a divisional of application Ser. No. 11/122,085, now allowed, which is a divisional of 10/337,376, which issued as U.S. Pat. No. 6,947,190 B2.

FIELD OF THE INVENTION AND RELATED ART

The present invention relates to an optical scanning apparatus preferably used as an exposing apparatus for an electrophotographic apparatus, in particular, an optical scanning apparatus which is capable of deflecting three or more beams of light in a scanning manner.

Recently, due to the demand for higher productivity, higher printing speed, and higher image quality, the research regarding an image forming apparatus such as a laser copying machine, a laser beam printer, etc., has been focused on increasing recording density.

However, the increase in printing speed has resulted in the increase in the laser modulation frequency, or the like, creating problems; for example, it has become difficult for a laser driving circuit to keep up with the laser modulation frequency required for the increased printing speed.

There are also limitations regarding a light deflecting device such as a polygon mirror in that a polygon minor is limited in the number of the minoring surfaces it can have, and that there is a limit to the revolution of the motor for rotating the polygon mirror.

There have been proposed various methods for solving the above described problems. According to one of such methods, the entirety of the portion of the peripheral surface of a photoconductive member in the exposing station, that is, the surface to be scanned, is scanned all at once.

In the case of this type of optical scanning apparatus, a plurality of beams of light are projected onto each of the deflective surfaces of a light deflecting device, and the plurality of beams of light deflected by the deflective surface are guided through a focusing optical system, onto the specific areas of the portion of the peripheral surface of the photoconductive drum in the exposing station, that is, the surface to be scanned, scanning the specific areas of the portion of the surface to be scanned, all at once, to record image formation information on the surface.

On the other hand, in the case of an optical scanning apparatus used in a laser copying machine also usable as a printer, a laser beam printer, etc., its resolution (recording density), which is expressed by the number of dots (picture elements) per unit length, that is, the so-called light beam pitch, must be changed in the primary as well as secondary scanning directions, depending on various factors, for example, the ambience in which the computer or the like of the optical scanning apparatus is operated, the software used by the computer or the like, etc.

When a light source apparatus which emits a single beam of light is employed as a means for varying the resolution, its resolution can be varied by varying the relationship between the revolution of the polygon mirror and the velocity of the peripheral surface of the photoconductive drum, that is, the surface to be scanned, while varying the light beam emission interval in terms of the primary scanning direction, that is, varying the image formation clock frequency.

However, a method for scanning all at once the entirety of the portion of the peripheral surface of a photoconductive drum in the exposing station by a plurality of beams of light has a problem in that the above described means for varying the resolution is not alone sufficient for varying the pitch, in terms of the secondary scanning direction, among the plurality of beams of light projected onto the same deflective surface.

Thus, a light source apparatus, in accordance with the prior art, which emits a plurality of beams of light, was structured so that the plurality of beams of light remained fixed in pitch, and its resolution was changed by changing the pitch of the plurality of beams of light on the peripheral surface of the photoconductive drum in terms of the secondary scanning direction by rotating the entirety of the light source apparatus about its optical axis, or by changing the peripheral velocity of the photoconductive drum at the same time as the pitch is changed.

Further, there have been proposed various light source apparatuses employing a plurality of light emitting elements as means for synthesizing a plurality of beams of light. One of such light source apparatuses, which has two light emitting elements, has a single synthesizing portion, and employs a polarizing prism as a synthesizing means.

If a light source apparatus, such as the above described light source apparatuses, employing a polarizing prism as the synthesizing means, has three or more light emitting elements, it must be provided with two or more synthesizing portions. Therefore, the beams of light from two or more light emitting elements pass through two or more synthesizing portions, making it impossible to employ a polarizing prism in order to utilize the difference in polarization direction. Thus, in order to solve this problem, a synthesizing prism equipped with a half mirror capable of both reflecting and transmitting at a constant ratio regardless of the polarization direction has been employed.

In the case of the above described prior technologies, however, the following problems have occurred.

That is, optical scanning apparatuses based on the technology which rotated the entirety of a light source apparatus to switch resolution, were too sensitive for proper adjustment.

Further, the demand for higher productivity led to the increase in the number of the beams of light, which in turn necessitated three or more light emitting elements, as well as additional synthesizing portions. As a result, the light source apparatuses became substantially larger, and also, unstable in terms of adjustment.

Moreover, the greater the number of synthesizing portions, the lower the half-mirror efficiency. Also as described above, a light source apparatus, which has a synthesizing means comprising two or more synthesizing portions having three or more light emitting elements, employs a synthesizing prism equipped with a half mirror. Therefore, such a light source apparatus requires light emitting elements which emit a larger amount of light.

SUMMARY OF THE INVENTION

The primary object of the present invention is to provide an optical scanning apparatus, the light beam intervals of which are variable.

Another object of the present invention is to provide an optical scanning apparatus, which is smaller in the amount of the light loss occurring during the synthesis of a plurality of beams of light.

Another object of the present invention is to provide an optical scanning apparatus comprising: a first optical member into which a plurality of beams of light are projected, and from which the plurality of beams of light projected thereinto are projected as a first group of beams of light, the intervals of which are narrower than those as they are projected into the first optical member, said first optical member being enabled to be rotated to adjust the intervals of the plurality of beams of light, on the surface to be scanned; and a second optical member into which the first group of beams of light projected from the first optical member, and a second beam of light, are projected, and from which the first group of beams of light and second beam of light are projected as a third group of beams of light, the intervals of which are narrower than those as they are projected into the second optical member, the second optical member being enabled to be rotated to change the intervals among the first groups of beams of light and second beam of light.

These and other objects, features, and advantages of the present invention will become more apparent upon consideration of the following description of the preferred embodiments of the present invention, taken in conjunction with the accompanying drawings.

BRIEF DESCRIPTION OF THE DRAWINGS

FIGS. 4A and 4B are drawings depicting the pitch of a plurality of beams of light on the surface being scanned, in terms of the secondary scanning direction.

FIGS. 5A and 5B also are drawings depicting the pitch of a plurality of beams of light on the surface being scanned, in terms of the secondary scanning direction.

FIG. 11A shows the portion comprising light emitting elements 901 and 902, and a half mirror 931, which synthesizes light beams A1 and A2. FIG. 11B shows the portion comprising light emitting element 901 having two light emitting portions. The portion shown in FIG. 11B can replace the portion shown in FIG. 11A.

DESCRIPTION OF THE PREFERRED EMBODIMENTS

Hereinafter, the preferred embodiments of the present invention will be described with reference to the appended drawings.

The present invention is characterized in that an optical scanning apparatus, which optically scans all at once the entirety of the surface to be scanned, such as the portion of the peripheral surface of a photoconductive drum in the exposing station, with the use of a plurality of beams of light, comprises a light beam pitch adjusting means capable of switching the light beam pitch (physical scanning line intervals) of the apparatus between two settings, in terms of the secondary scanning direction, that is, the direction perpendicular to the primary scanning direction, in order to make it possible for the image formation data can be recorded at two different resolutions (recording density). The measurements, materials, and configurations of the structural components, as well as the positional relationship among them, in the following embodiments of the present invention, are to be modified as necessary, depending on the structures of the apparatuses to which the present invention is applied, and the conditions under which the present invention is applied. In other words, the following embodiments of the present invention are not intended to limit the scope of the present invention.

Embodiment 1

Figure 1:
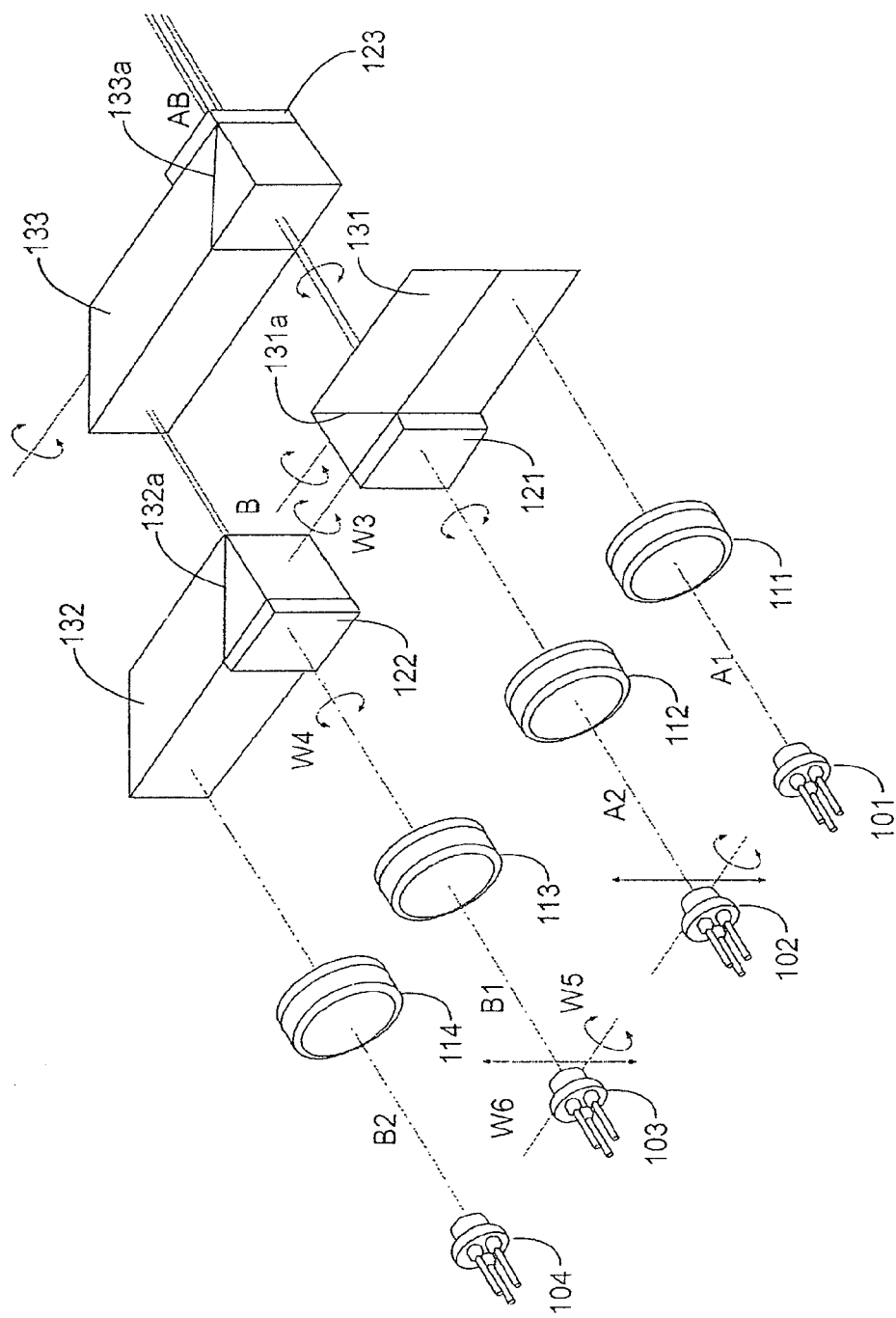
FIG. 1 is a schematic perspective view of the first embodiment of a light source apparatus in accordance with the present invention.
Figure 2:
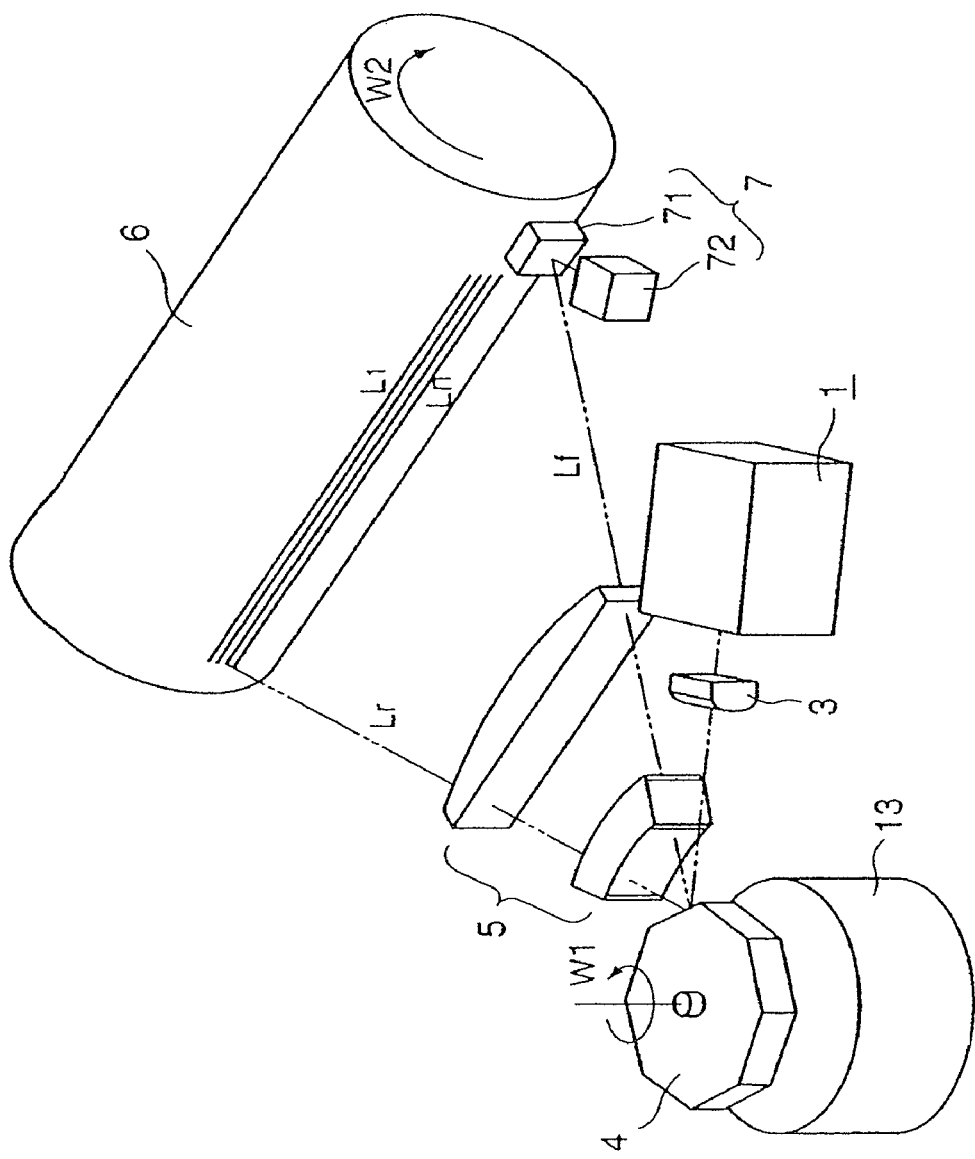
FIG. 2 is a schematic perspective view of the optical scanning apparatus in the first embodiment of a light source apparatus in accordance with the present invention.
Figure 3:
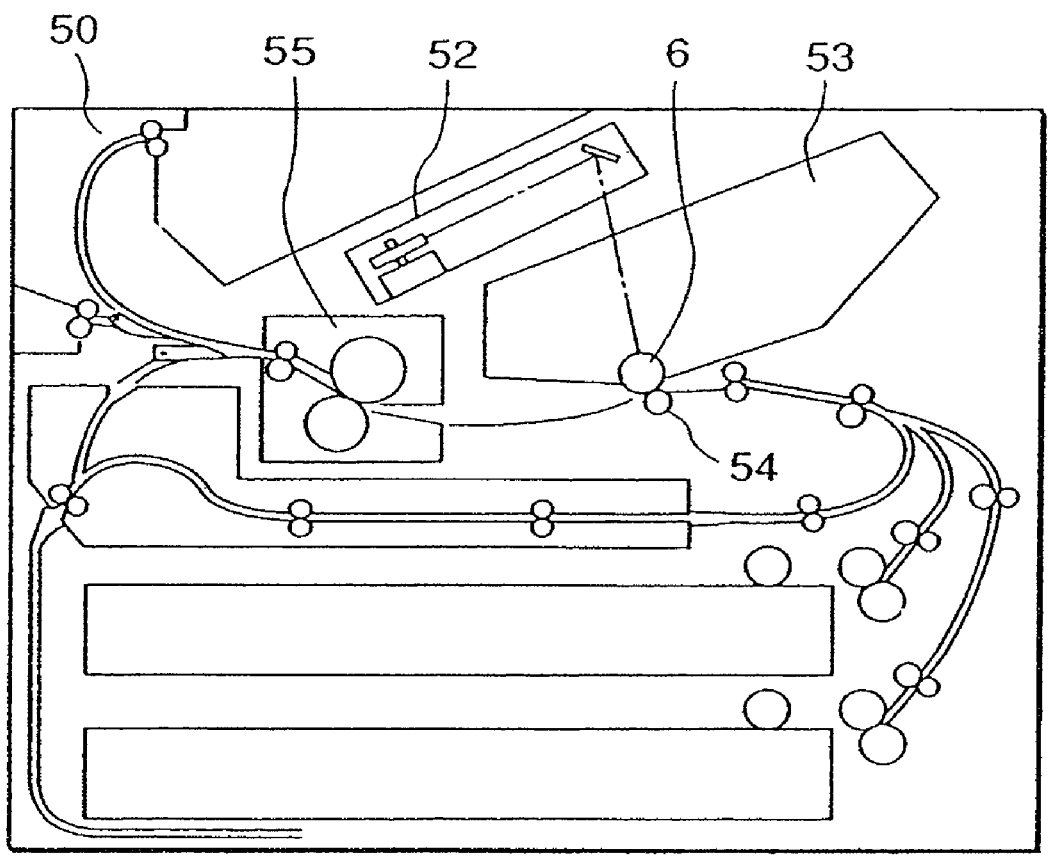
FIG. 3 is a schematic drawing of a typical image forming apparatus.

FIG. 1 is a perspective view of the first embodiment of a light source apparatus in accordance with the present invention, which is a beam synthesizing portion for synthesizing a plurality of beams of light. FIG. 2 is a perspective view of an optical scanning apparatus. FIG. 3 is a sectional view of an image forming apparatus employing the apparatuses in FIGS. 1 and 2, as exposing apparatuses.

Referring to FIG. 3, an image forming apparatus 50 makes its optical scanning apparatus 52 emit a plurality of beams of laser light modulated with the obtained image formation information, so that the plurality of beams of laser light emitted from the optical scanning apparatus 52 illuminate the peripheral surface of the photoconductive member 6 in a process cartridge 53.

Next, the image forming operation carried out by the image forming means of the image forming apparatus 50 will be described.

A latent image is formed on the peripheral surface of the photoconductive drum 6, and is developed by the process cartridge 53, with the use of toner.

Meanwhile, a plurality of sheets of recording medium are conveyed by the combination of conveying rollers and a separation pad, while being separated one by one, and are conveyed further downstream by another group of conveying rollers. As each of the plurality of recording medium sheets is conveyed, the image realized on the peripheral surface of the photoconductive drum 6 with the use of toner is transferred onto the sheet by a transferring means 54.

After receiving an unfixed toner image, the recording medium sheet is conveyed further downstream into a fixing means 5, in which the unfixed image is fixed to the recording medium sheet. Thereafter, the recording medium sheet is discharged from the image forming apparatus by a group of discharge rollers.

FIG. 2 is a schematic perspective view of an optical scanning apparatus 52. This drawing does not show the deflection minor for guiding the plurality of beams of light onto an image bearing member.

In FIG. 2, a referential numeral 1 stands for a light source apparatus which has a semiconductor laser, as a light generating means, comprising one or more light emitting portions, and which projects three or more beams of light at the same time.

Designated by a referential numeral 3 is a cylindrical lens capable of refracting the beams of light at a predetermined angle, only in the secondary scanning direction.

A light deflecting device 4 is a rotational polygonal minor, and is rotated by a motor 13 as a means for rotationally driving the light deflecting device 4, at a predetermined constant velocity in the direction indicated by an arrow mark w1 in the drawing. The revolution of light deflecting device 4 is kept constant at a predetermined revolution, by an unshown control system.

Designated by a referential numeral 5 is a focusing means comprising an f-θ lens, etc., which condenses the plurality of beams of light deflected by the light deflecting device 4, and focuses them on different points of the peripheral surface of the photoconductive drum 6, that is, the points to be exposed.

The photoconductive drum 6 is rotated by an unshown mechanism at a predetermined constant velocity in the direction indicated by an arrow mark w2 in the drawing.

Designated by a referential numeral 7 is a means for detecting both the synchronization and pitch of the light beams. This detecting means 7 is at a location Lf, which is the starting point of the scanning of the peripheral surface of the photoconductive drum 6 with the beams of light. It has a deflection mirror 71, and a circuit 72 which detects horizontal synchronization signals and light beam pitch.

In order to obtain horizontal synchronization signals (BD signals) for adjusting the timing with which the scanning of the peripheral surface of the photoconductive drum 6 is started from the starting point, and the signals representing the pitch, in terms of the secondary scanning direction, of a plurality of beams of light ($L_1$-$L_n$) deflected all at once by each of the deflective surfaces of the light deflecting device 4 in a manner to scan the peripheral surface of the photoconductive drum 6, the plurality of beams of light deflected by the light deflecting device 4 are each partially received by the light beam pitch detecting circuit 72 via the deflection minor 71.

Further, the timing with which the plurality of beams of light are emitted from the light source apparatus 1 in synchronism with the BD signals from the light beam pitch detecting circuit 72 is controlled by an unshown light emission control circuit, with the use of the BD signals. Also, the light beam pitch is adjusted by the unshown light emission control circuit, with the use of the light beam pitch signals from the detection circuit 72.

FIG. 1 is a schematic perspective view of the light source apparatus 1, which comprises four light emitting elements, each of which has a single light emitting portion.

Designated by referential numerals 101-104 are semiconductor lasers, as light emitting elements, each of which has a single light emitting portion. The light beams discharged from the four light emitting elements are A1, A2, B1, and B2, respectively.

Referential numerals 111-114 stand for collimator lenses, which make virtually parallel the light beams discharged from the light emitting elements 101-104. The collimator lenses 111-114 are positioned so that their axial lines coincide with the optical axes of the corresponding light emitting elements.

Referential numerals 121 and 122 stand for half-wave plates, which rotate 90 degrees the polarization directions of the virtually parallelized light beams A2 and B1.

Designated by referential numerals 131 and 132 are polarizing prisms, as a synthesizing means, which are synthesizing prisms of a certain type. The surface 131a of the prism 131 transmits the entirety of the light beam A2, the polarization direction of which has been rotated 90 degrees, while deflecting the entirety of the light beam A1, the polarization direction of which has not been rotated. Therefore, the light beams A1 and A2 are combined, without any loss, into a synthetic light beam A, which is projected toward a half-mirror/synthesizing prism 133. Similarly, the surface 132a of the prism 132 allows the light beam B1 to transmit in its entirety the prism 132 while deflecting the light beam B2 in its entirety. As a result, the light beams B1 and B2 are combined into a synthetic light beam B, which is projected toward the half-mirror/synthesizing prism 133.

In other words, the synthetic light beam A is the combination of the light beams A1 and A2, which are different in the polarization direction, and the pitch between which in terms of the secondary scanning direction has been set to a predetermined value. Similarly, the synthetic light beam B is the combination of the light beams A2 and B2, which are different in the polarization direction, and the pitch between which in terms of the secondary scanning direction has been set to a predetermined value.

As for the half-mirror/synthesizing prism 133 (which hereinafter will be referred to as half-mirror) as a synthesizing means, its surface 133a allows one half of each of the light beams A and B to transmit through the half-minor 133 while deflecting the other half of each of the light beams A and B. As a result, a light beam AB is synthesized with a loss of 50%. The light beam AB is circularly polarized by a quarter-wave plate 123, and is projected toward the cylindrical lens 3 shown in FIG. 2. Instead of disposing a single quarter-wave plate 123 at the position shown in FIG. 1, two quarter-wave plates 123 may be disposed between the polarizing prism 131 and half-mirror 133 and between the polarizing prism 132 and half-minor 133, one for one.

The synthetic light beam AB is the combination of light beams A1, A2, B1, and B2, the pitch among which in terms of the secondary scanning direction has been set to a predetermined value.

In this embodiment, the light source apparatus 1 is structured so that the light beams A1 and A2 are allowed to pass through the polarizing prism 131 only once, and so that the light beams B1 and B2 are allowed to pass through the polarizing prism 132 only once.

Further, the light source apparatus 1 is structured so that the light beam A2 is allowed to pass in its entirely through all the synthesizing prisms (polarizing prism 131 and half-mirror 133) and constitutes the absolute optical axis of the light source apparatus 1.

Next, referring to FIGS. 1, 4A, and 4B, the method, in accordance with the present invention, for adjusting the pitch of the plurality of light beams will be described. FIGS. 4A and 4B are drawings depicting the light beam pitch (physical scanning line interval) on the surface being scanned, in terms of the secondary scanning direction.

If the values of the first and second light beam pitch setting, on the surface being scanned, are 21.15 and 42.3 (μm) (1,200 and 600 dpi in resolution), respectively, the polarizing prism 132 is rotated by an angle adjusting means (not shown) about its lengthwise axis in the direction w3, so that the pitch (physical scanning line interval) between the light beams B1 and B2 in terms of the secondary scanning direction becomes 42.3 (μm) on the surface being scanned as shown in FIGS. 4A and 4B.

The pitch between the light beams B1 and B2 can also be adjusted to the aforementioned value by rotating the polarizing prism 132 in the direction w4 about the optical axis of the light beam B1.

Further, the pitch between the light beams B1 and B2 can be adjusted to the aforementioned value by rotating the light emitting element 103 or 104 in the direction w5 about a horizontal axis perpendicular to the optical axis of the light beam emitted from the light emitting element 103 or 104, respectively, or moving the light emitting element 103 or 104 in the vertical direction w6 perpendicular to the optical axis of the light beam emitted from the light emitting element 103 or 104, respectively.

Similarly, the pitch between the light beams A1 and A2 in terms of the secondary scanning direction, on the surface being scanned, can be adjusted to 42.3 ($\mu$m), as shown in FIGS. 4A and 4B, by rotating the polarizing prism 131, or rotating or moving the light emitting element 101 or 102.

Next, the half-mirror 133 is rotated by an angle adjusting means (not shown), which is a switching means. Also rotated are the polarizing prisms 131 or 132, so that the pitch between the light beams A1 and B1 (as well as the pitch between light beams A2 and B2) becomes 21.15 ($\mu$m) while keeping at 42.3 ($\mu$m) the pitches between the light beams A1 and A2 and between the light beams B1 and B2. As a result, all the pitches between two adjacent light beams, in terms of the secondary scanning direction, become 21.15 ($\mu$m), as shown in FIG. 4A. In this case, the angle adjusting means constitutes the switching means.

Even if the order of the light beams A1 and B1 in terms of the secondary scanning direction is changed, the pitches between two adjacent light beams become 21.15 ($\mu$m), as shown in FIG. 4B, realizing the first light beam pitch setting.

Further, the order of the light beams A1 and A2, and the order of the light beams B1 and B2, in FIG. 4, do not need to exactly correspond to those of the light beams A1 and A2 and the light beams B1 and B2, in FIG. 1. In other words, the positional switching between the light beams A1 and A2 and between the light beams B1 and B2 does not create any problem.

Next, referring to FIGS. 4A, 4B, 5A, and 5B, the method, in accordance with the present invention, for changing the light beam pitch in terms of the secondary scanning direction will be described. FIGS. 5A and 5B are drawings depicting the light beam pitch, in terms of the secondary scanning direction, on the surface being scanned.

It is as described above that the pitch between the light beams A and B can be varied by the rotation of the half-mirror 133. The optical scanning apparatus can be switched from the first scanning setting, at which the pitch between any two adjacent light beams is 21.15 ($\mu$m), to the second scanning setting, by rotating the half-mirror 133 by a predetermined angle from the position corresponding to the first scanning setting.

More specifically, when the surface being scanned is being moved in the secondary scanning direction and the light beam pitch of the light source apparatus 1 is as shown in FIG. 4A, the light beams B1 and B2 are moved by 63.45 ($\mu$m) in the delaying direction (downward when looking squarely at the drawing) relative to the surface being scanned. As a result, the pitch between the light beams A2 and B1 is changed to 42.3 ($\mu$m) while the pitches between the light beams A1 and A2 and between the light beams B1 and B2 are kept at 42.3 ($\mu$m), as shown in FIG. 5A.

Similarly, by moving the light beams B1 and B2, being projected as shown in FIG. 4A by 105.75 ($\mu$m) in the advancing direction (upward when squarely looking at the drawing) relative to the surface being scanned, the pitch between the light beams B2 and A1 can be changed to 42.3 ($\mu$m), with the pitches between the light beams A1 and A2 and between the light beams B1 and B2 kept at 42.3 ($\mu$m), as shown in FIG. 5B.

It also is possible to change the light beam pitch as shown in FIG. 5A or 5B, by moving the light beams B1 and B2, being projected as shown in FIG. 4B, either in the delaying direction (downward when squarely looking at the drawing) by 105.75 ($\mu$m), or in the advancing direction (upward when squarely looking at the drawing) by 63.45 ($\mu$m).

Next, referring to FIGS. 2, 4A, 4B, 5A, and 5B, the means for switching the resolution of the optical scanning apparatus with the utilization of the light source apparatus 1 will be described.

When the light source apparatus 1 is set to the first scanning setting as shown in FIG. 4A or 4B, the light deflecting device 4 is rotated by a motor 13 in the direction w1 in the drawing at a constant velocity V, being controlled by a control system (not shown).

As the light source apparatus 1 is switched from the first scanning setting to the second scanning setting shown in FIG. 5A or 5B, it is detected by a detection circuit 72 that the light beams, which are scanning the peripheral surface of the photoconductive drum 6, have changed in pitch.

The change in scanning setting can be detected as long as the light source apparatus 1 can be structured so that the pitch of each group of light beams does not change with the elapse of time. For example, if the pitch between the light beams A1 and B1 is one half the pitch between the light beams A1 and A2, the setting of the light source apparatus 1 is the first position, whereas if the pitch between the light beams A2 and B1 is equal to the pitch between the light beams A1 and A2, the scanning setting of the light source apparatus 1 is the second position.

However, when the pitch of each group of light beams varies with the elapse of time, the pitch of each group of light beams must be accurately detected and must be adjusted, in addition to simply switching the scanning setting. Therefore, a structural arrangement is made so that the optical distance from the light deflecting device 4 to the light beam detecting surface of the detection circuit 72 via the deflection mirror 71 becomes equal to the distance from the light deflecting device 4 to the peripheral surface f the photoconductive drum 6.

When the detection circuit 72 is integrally disposed in the optical scanning apparatus, it is sometimes difficult to make such a structural arrangement that the aforementioned optical distance from the light deflecting device 4 to the light beam detecting surface becomes equal to the distance from the light deflecting device 4 to the peripheral surface of the photoconductive drum 6. In such a case, the ratio of the distance from the light deflecting device 4 to the peripheral surface of the photoconductive drum 6, relative to the distance from the light deflecting device 4 to the light beam detecting surface, is predetermined, and the positional relationship between the detection circuit and optical scanning apparatus is adjusted so that as the optical scanning apparatus is attached to the main assembly of an image forming apparatus or the like, the ratio of the distance from the light deflecting device 4 to the light beam detecting surface, relative to the distance from the light deflecting device 4 to the peripheral surface of the photoconductive drum 6, becomes virtually equal to the predetermined one.

The switching of the light beam pitch may be detected either by placing within the light source apparatus, a mechanism for detecting the angle by which the synthesizing prism is rotated, or by using the detection circuit 72 and this detecting mechanism in combination.

As the switching of the light beam pitch resulting from the change in the resolution setting of an image forming apparatus is detected, the detection signal is sent to a light deflecting device control system (controlling means) (not shown). As a result, the control system changes the velocity of the light deflecting device 4 to V/2 by changing the revolution of the motor 13.

In addition, the detection signal is also sent to an image formation clock generation circuit (not shown). As a result, the clock generation circuit changes the image formation clock frequency to ¼, changing thereby the resolution to ½ in terms of both the primary and secondary directions.

The detection signal is also sent to an image formation control circuit (not shown). As a result, the image data with which the light beam B1 is modulated, and the image data with which the light beam A1 is modulated, are switched by the image formation control circuit.

As described above, according to this embodiment of the present invention, the light beam pitch in terms of the secondary scanning direction can be easily switched between two stages, that is, the first and second scanning pitch settings; it can be switched by simply rotating the half-mirror 133 with the use of the switching means.

When the scanning pitch setting of an optical scanning apparatus comprising this light source apparatus 1 is switched to the second position, the light beam pitch in terms of the secondary scanning direction can be seamlessly doubled by halving the defective surface switching speed of the light deflecting device, making it possible to project light beams so that the surface to be scanned can be scanned at two different resolutions.

Further, in the case of a light source apparatus employing three or more light emitting elements, the loss of the laser power can be minimized by employing at least one synthesizing prism, as a synthesizing means, made up of a polarizing prism.

Further, the light source apparatus is structured so that at least one light beam from one of the light emitting elements is entirely transmitted, making it possible to use this light beam as the absolute optical axis of the light source apparatus. Therefore, when mounting the light source apparatus in the optical scanning apparatus, it is easy to accurately position the two apparatuses relative to each other, and also, to adjust the light beam pitch.

Embodiment 2

Next, referring to FIG. 6, the second embodiment of a light source apparatus in accordance with the present invention will be described. The components in FIG. 6, which do not have a referential numeral are the same as those in FIG. 1. Therefore, they will be not be described. Further, the components which are identical in name to those in FIG. 1 are identical in function to those with the same referential numeral. Therefore, they also will not be described.

Figure 6:
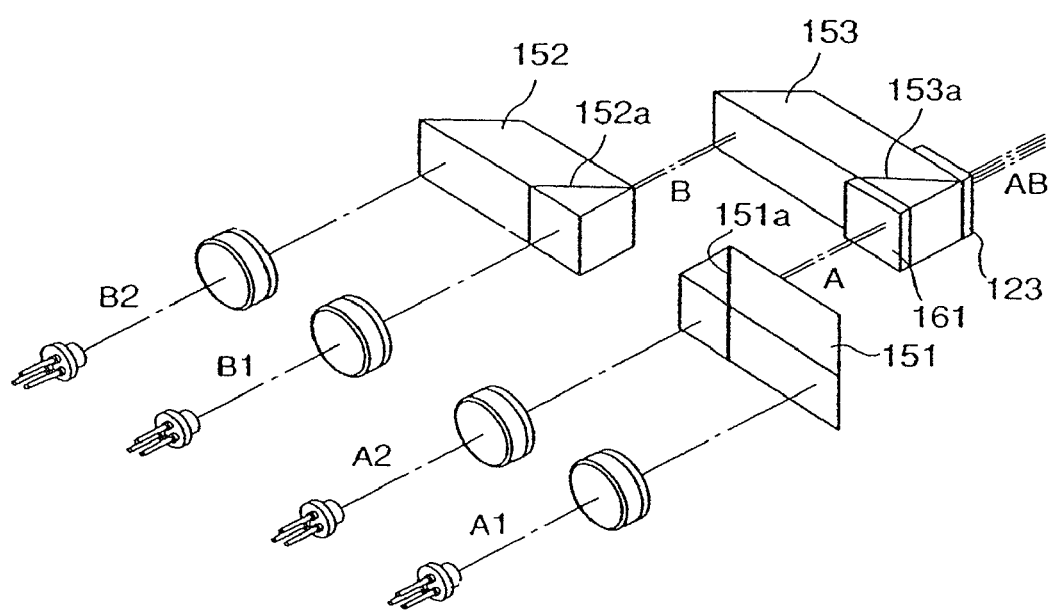
FIG. 6 is a schematic perspective view of the second embodiment of a light source apparatus in accordance with the present invention.

FIG. 6 is a schematic perspective view of this embodiment of the light source apparatus. This light source apparatus is different from the first embodiment of the light source apparatus, and comprises four light emitting elements, each of which has a single light emitting portion.

Designated by referential numerals 151 and 152 are half-mirrors as synthesizing means. The surface 151a allows one half of each of the light beams A1 and A2 to pass the half mirror 151 while deflecting the other half of each of the light beams A1 and A2. As a result, light beam A is synthesized at approximately 50% efficiency, and is projected toward the polarizing prism 153. Similarly, the surface 152a allows one half of each of the light beams B1 and B2 to pass the half-mirror 152 while deflecting the other half of each of the light beams B1 and B2. As a result, a light beam B is synthesized by the half-mirror 152 at an efficiency of approximately 50%, and is projected toward the polarizing prism 153.

Designated by a referential numeral 161 is a half-wave plate, which rotates 90 degrees the polarization direction of the light beam A converted into a virtually parallel luminous flux.

Designated by referential numeral 153 is a polarizing prism as a synthesizing means. It transmits the entirety of the light beam A, the polarization direction of which has been rotated by 90 degrees by the surface 153a, while deflecting the entirety of the light beam B, the polarization direction of which has not been rotated. Therefore, the light beams A and B are combined, without any loss, into a synthetic light beam AB. The synthetic light beam AB is circularly polarized by a quarter-wave plate 123, and is projected toward the cylindrical lens 3 depicted in FIG. 2.

Also in this embodiment, the light source apparatus is structured so that the light beams A1, A2, B1, and B2 are allowed to pass the polarizing prism 153 only once.

Further, the light beam A2 is allowed to pass in entirety through all the synthesizing prisms, that is, synthesizing prisms 151 and 153, being used as the absolute optical axis of this light source apparatus.

In terms of the method for adjusting the light beam pitch and the method for switching the scanning pitch setting between the first and second position, this embodiment is the same as the first embodiment. In other words, the adjustment and switching are made by moving the synthesizing prism disposed at a position equivalent to the synthesizing prism position in FIG. 1, in the same manner as the synthesizing prism in the first embodiment.

Embodiment 3

Next, referring to FIG. 7, the third embodiment of the light source apparatus in accordance with the present invention will be described. The components in FIG. 7, which do not have a referential numeral, are identical to those in FIG. 1. Therefore, they will be not be described. Further, the components which are identical in name to those in FIG. 1 are identical in function to those with the same referential numeral. Therefore, they also will not be described.

Figure 7:
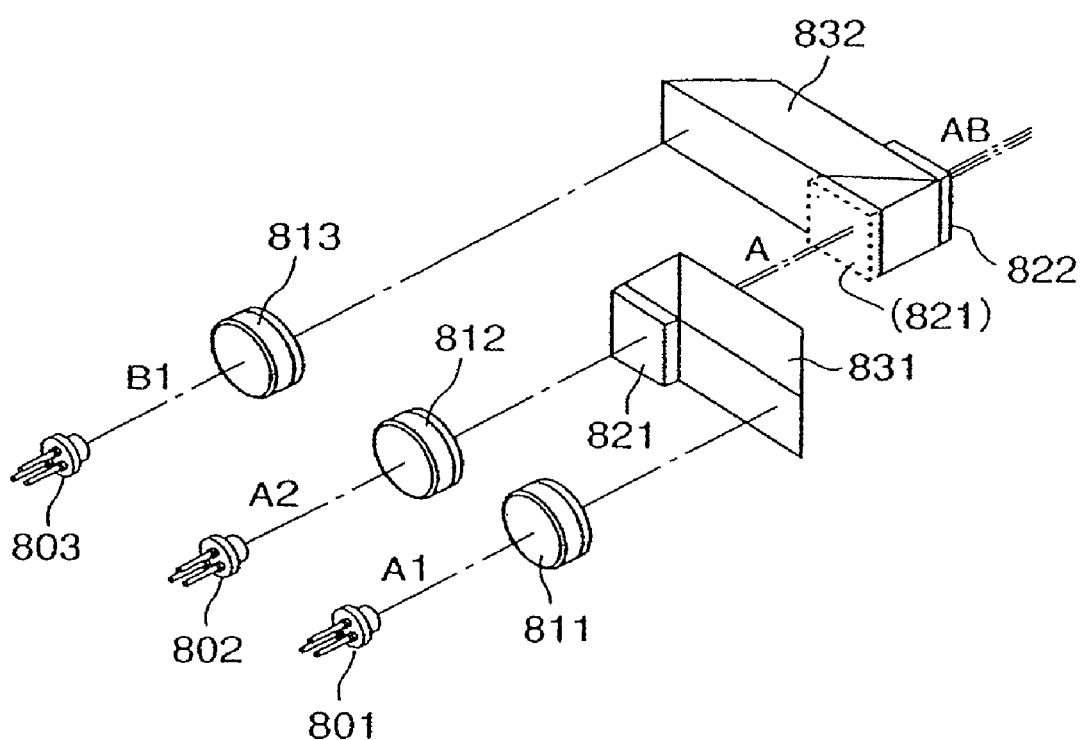
FIG. 7 is a schematic perspective view of the third embodiment of a light source apparatus in accordance with the present invention.

FIG. 7 is a schematic perspective view of this embodiment of the light source apparatus. This light source apparatus is another modification of the first embodiment of the light source apparatus, and comprises three light emitting elements 801-803, each of which has a single light emitting portion. Designated by referential numerals 811-813 are collimator lenses.

Designated by referential numeral 831 is a polarizing prism. The polarizing prism synthesizes a light beam A by transmitting in entirety the light beam A2, the polarization direction of which has been rotated 90 degrees by a half-wave plate 821 while reflecting in entirety the light beam A1, the polarization direction of which has not been rotated, and projects the light beam A toward a half-mirror 832.

The half mirror 832 is a synthesizing means, and synthesizes, at 50% efficiency, a light beam AB by transmitting one half of each of the light beams A and B1. Then, it projects the light beam AB toward a cylindrical lens similar to the cylindrical lens 3 shown in FIG. 2.

The light source apparatus in this embodiment is structured so that the light beams A1 and A2 are allowed to pass the polarizing prism 831 only once.

Further, the light beam A2 is allowed to pass in entirety through all the synthesizing prisms, that is, synthesizing prisms 831 and 832, being used as the absolute optical axis of this light source apparatus.

Effects similar to those described above can be obtained by replacing the synthesizing prisms 831 and 832 with a half-mirror and a polarizing prism, respectively, and disposing the half-wave plate 821 at the position contoured by a broken line in FIG. 7.

In such a case, the light beams A1, A2, and B1 are allowed to pass the polarizing prism 832 only once.

Figure 8:
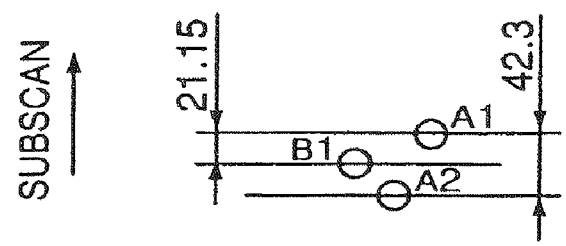
FIGS. 8A and 8B are drawings depicting the pitch of a plurality of beams of light on the surface being scanned, in terms of the secondary scanning direction.
Figure 8:
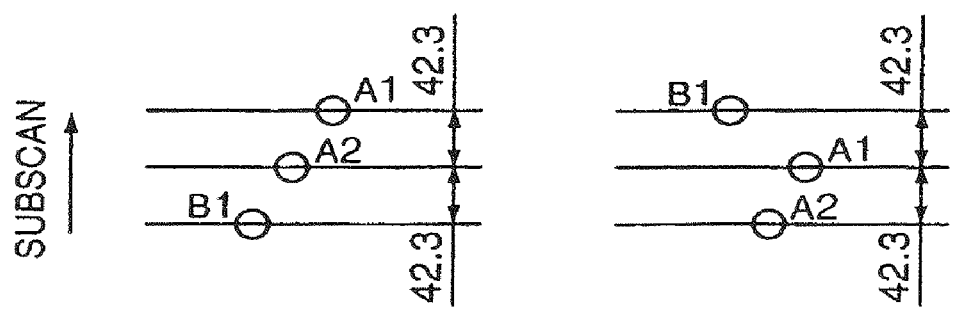

Next, referring to FIGS. 7, 8A, and 8B, the method for switching the light beam pitch in terms of the secondary scanning direction will be described. FIGS. 8A and 8B are drawings depicting the light beam pitch on the surface being scanned, in terms of the secondary scanning direction.

In order to switch the light beam pitch when the light beam pitch setting is such that when it is at the first position, the light beam pitch on the surface being scanned in terms of the secondary scanning direction is 21.15 (μm) (1,200 dpi in resolution), whereas when it is at the second position, the light beam pitch is 42.3 (μm) (600 dpi in resolution), the pitch between the light beams A1 and A2 (physical scanning line interval) is adjusted to 42.3 (μm), as shown in FIGS. 8A and 8B.

Next, the half-minor 832 is rotated by an angle adjusting means (not shown) to adjust the pitch between the light beams A1 and B1 to 21.15 (μm) while keeping the pitch between the light beams A1 and A2 at 42.3 (μm), as shown in FIG. 8A. As a result, the pitch between any two adjacent light beams in terms of the secondary scanning direction becomes 21.15 (μm); in other words, the light beam pitch setting corresponding to the first position is realized.

When the light beam pitch setting is as shown in FIG. 8A and the surface being scanned is moving in the secondary scanning direction indicated by an arrow mark also as shown in FIG. 8A, the second light beam pitch setting, at which the pitch of any two adjacent light beams is 42.3 (μm), as shown in FIG. 8B, can be realized by moving the light beam B1 by 63.45 (μm) either in the delaying direction (downward when squarely looking at the drawing), or the advancing direction (upward when squarely looking at the drawing), relative to the surface being scanned.

Embodiment 4

Next, referring to FIG. 9, the fourth embodiment of the light source apparatus in accordance with the present invention will be described. The components in FIG. 7, which do not have a referential numeral, are identical to those without a referential numeral in FIG. 1. Therefore, they will be not be described. Further, the components which are identical in name to those in FIG. 1 are identical in function to those with the same referential numeral. Therefore, they also will not be described.

Figure 9:
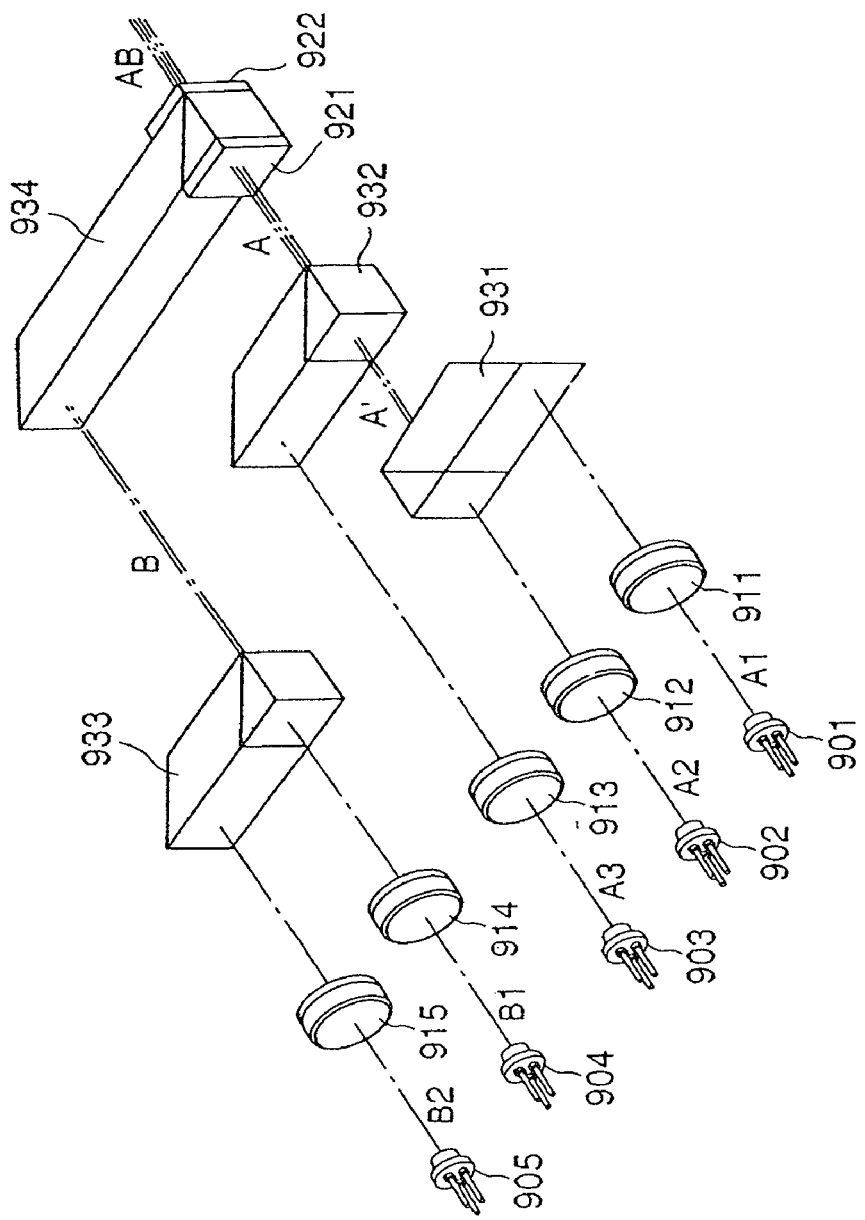
FIG. 9 is a schematic perspective view of the fourth embodiment of a light source apparatus in accordance with the present invention.

FIG. 9 is a schematic perspective view of the light source apparatus in this embodiment. This light source apparatus is another modification of the first embodiment of the light source apparatus in accordance with the present invention, and comprises five light emitting elements 901-905, each of which has a single light emitting portion. Designated by referential numerals 911-915 are collimator lenses.

Designated by referential numeral 931 is a half-mirror as a polarizing means. The half-mirror 931 synthesizes, at 50% efficiency, a light beam A' by transmitting one half of each of the light beams A1 and A2 while reflecting the other half of each of the light beams A1 and A2, and projects the light beam A' toward a half-minor 932.

Similarly, a half-mirror 932 as a synthesizing means synthesizes a light beam A from the light beams A' and A3, and projects the light beam A toward a polarizing prism 934. Further, a half-mirror 933 as a synthesizing means synthesizes a light beam B from light beams B1 and B2, and projects the light beam B toward a polarizing prism 934.

The polarizing prism 934 as a synthesizing means synthesizes a light beam AB by transmitting in entirety the light beam A, the polarization direction of which has been rotated 90 degrees by a half-wave plate 921, while reflecting in entirety the light beam B, the polarization direction of which has not been rotated. Then, it projects the light beam AB toward a cylindrical lens identical to the cylindrical lens 3 in FIG. 2, after circularly polarizing the light beam AB by a quarter-wave plate 922.

Figure 10A:
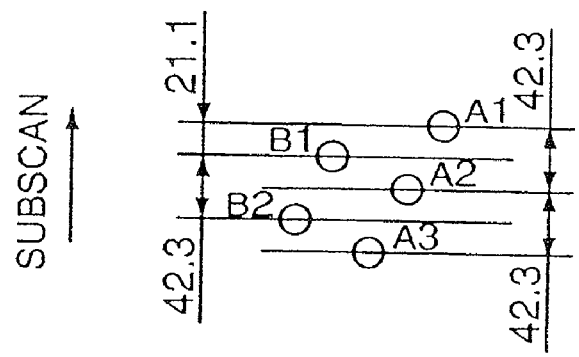
FIGS. 10A and 10B are drawings depicting the pitch of the plurality of beams of light on the surface being scanned, in terms of the secondary scanning direction.
Figure 10B:
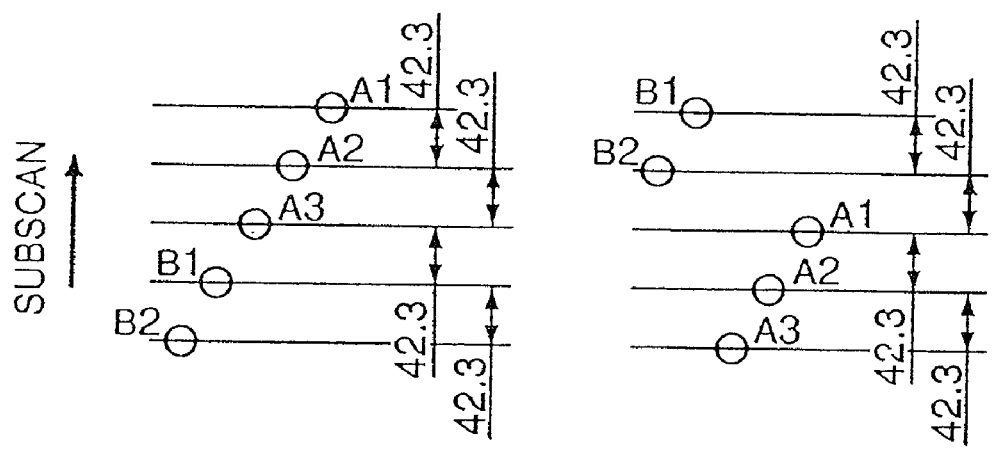

Next, referring to FIGS. 9, 10A, and 10B, the method for switching the light beam pitch in terms of the secondary scanning direction will be described. FIGS. 10A and 10B are drawings depicting the light beam pitch on the surface being scanned, in terms of the secondary scanning direction.

It is assumed that the light beam pitch setting is such that when it is at the first position, the light beam pitch on the surface being scanned in terms of the secondary scanning direction is 21.15 (μm) (1,200 dpi in resolution), whereas when it is at the second position, the light beam pitch is 42.3 (μm) (600 dpi in resolution). In order to switch the light beam pitch from the first light beam pitch setting to the second light beam pitch setting, the pitch among the light beams A1, A2, and A3 (physical scanning line intervals) is adjusted to 42.3 (μm), as shown in FIGS. 10A and 10B.

Similarly, the pitch between the light beams B1 and B2 (scanning line intervals in physical terms) is adjusted to 42.3 (μm).

During this adjustment, the light beams B1 and B2 may be switched in position. Further, the positional order among the light beams A1, A2, and A3 does not need to be as it is presented here.

Next, the polarizing prism 934 is rotated by an angle adjusting means (not shown) to adjust the pitch between the light beams A1 and B1 to 21.15 (μm) while keeping the pitch among the light beams A1, A2, and A3, and the pitch between the light beams B1 and B2, at 42.3 (μm), as shown in FIG. 10A. As a result, the pitch between any two adjacent light beams in terms of the secondary scanning direction becomes 21.15 (μm); in other words, the light beam pitch setting corresponding to the first position is realized.

When the light beam pitch setting is as shown in FIG. 10A and the surface being scanned is moving in the secondary scanning direction indicated by an arrow mark also in FIG. 10A, the second light beam pitch setting, at which the pitch of any two adjacent light beams is 42.3 (μm), as shown in FIG. 10B, can be realized by moving the light beams B1 and B2 by 105.75 (μm) either in the delaying direction (downward when squarely looking at the drawing), or in the advancing direction (upward when squarely looking at the drawing), relative to the surface being scanned.

Embodiment 5

Effects similar to those obtained by the above described first to fourth embodiments can also be obtained by replacing the light source portion comprising the plurality of light emitting elements, each of which has a single light emitting portion, and a half-mirror as a synthesizing portion, with a single light emitting element having a plurality of light emitting portions.

Figure 11B:
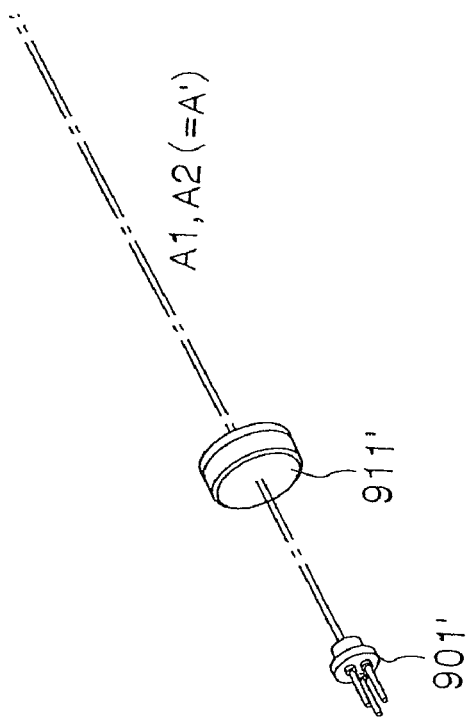
FIGS. 11A and 11B are schematic perspective views of portions of a light source apparatus.

Next, referring to FIGS. 11A and 11B, an example of a light source portion in the fifth embodiment of the light source apparatus in accordance with the present invention will be described.

Figure 11A:
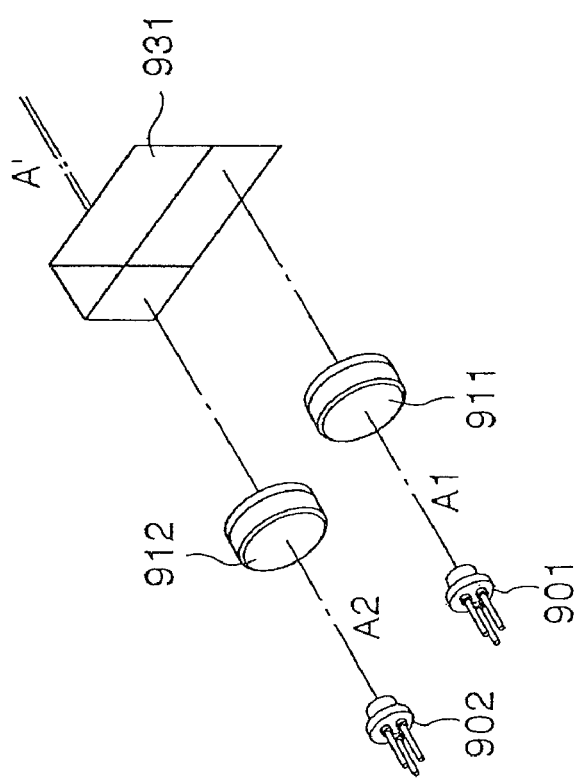

FIG. 11A shows the portion of this embodiment of the light source apparatus equivalent to the portion of the light source apparatus in FIG. 9, from the light emitting elements 901 and 902 to the half-mirror 931 as a synthesizing means for combining the light beams A1 and A2. FIG. 11B shows a modification of the structure shown in FIG. 11A, in which the components shown in FIG. 11A have been replaced with the combination of a single light emitting element 901' having two light emitting portions and a collimator lens 911'. Referring to FIG. 11B, the light beams A1 and A2 emitted from the light emitting element 901' are made virtually parallel by the collimator lens 911' disposed in such a manner that its axis coincides with the optical axis of the light beam A' (A1, A2).

The pitch between the two light beams emitted, one for one, from the two light emitting portions of the single light emitting element becomes fixed when the light emitting element is manufactured. Therefore, the adjustment is made by rotating the light emitting element about its optical axis.

As described above, according to the present invention, a light source apparatus is structured so that a plurality of light beams are divided into two groups of light beams, which are fixed in light beam pitch while being different in light beam pitch. Further, it is provided with a switching means for switching the positional relationship between the two groups of light beams, in terms of the secondary scanning direction, on the surface being scanned. Therefore, the light beam pitch of the light source apparatus can be easily switched between two settings.

Further, at least one of the synthesizing means is made up of a polarizing prism, and all the light beams are allowed to pass the polarizing prism no more than once. Therefore, the laser efficiency loss is minimized (power is reduced to half).

Further, at least one of the light beams is allowed to pass in entirety the optical components, making it possible to use it as the absolute optical axis of the light source apparatus. Therefore, the adjustment of the light beam pitch in terms of the secondary scanning direction, and the resolution switch, can be easily made.

While the invention has been described with reference to the structures disclosed herein, it is not confined to the details set forth, and this application is intended to cover such modifications or changes as may come within the purposes of the improvements or the scope of the following claims.

What is claimed is:

1. An optical scanning apparatus for scanning a rotating photosensitive member with a light beam deflected by a rotatable polygonal mirror, said optical scanning apparatus comprising:
    a first light source for outputting a first light beam;
    a second light source for outputting a second light beam;
    a third light source for outputting a third light beam;
    a fourth light source for outputting a fourth light beam;
    a fifth light source for outputting a fifth light beam;
    a first optical unit for adjusting a distance between imaging positions of the first light beam and the second light beam and a distance between imaging positions of the second light beam and the third light beam, to a first distance with respect to a rotational moving direction of the photosensitive member;
    a second optical unit for adjusting a distance between the fourth light beam and the fifth light beam to a second distance;
    a third optical unit for adjusting the imaging positions of the fourth light beam and the fifth light beam relative to the first light beam, the second light beam and the third light beam, the imaging positions of which are adjusted by said first optical unit,
    wherein by rotational adjustment of said third optical unit,
    the fourth light beam is capable of being imaged between the first light beam and the second light beam, and the fifth light beam is capable of being imaged between the second light beam and the third light beam, with respect to the rotational moving direction of the photosensitive member, or
    the fourth and fifth light beams and the first and second light beams are capable of being imaged at positions across the third light beam from each other with respect to the rotational moving direction of the photosensitive member.

2. An apparatus according to claim 1, wherein the first distance and the second distance are the same.

3. An apparatus according to claim 2, wherein when the fourth light beam is imaged between the first light beam and the second light beam, and the fifth light beam is imaged between the second light beam and the third light beam, a distance between the first light beam and the third light beam and a distance between the third light beam and the second light beam are capable of being adjusted to be one half of the first distance, and
    when the fourth and fifth light beams and the first and second light beams are imaged at positions across the third light beam from each other with respect to the rotational moving direction of the photosensitive member, a distance between the imaging positions of the third light beam and the fourth light beam is capable of being adjusted to be the second distance.

* * * * *